United States Patent [19]

Chan et al.

[11] Patent Number: 4,841,560
[45] Date of Patent: Jun. 20, 1989

[54] DIRECT ACCESS TEST UNIT FOR CENTRAL OFFICE

[75] Inventors: Aaron Chan, Moorpark; Ben Pierce, Thousand Oaks; Leslie Shafto, Camarillo, all of Calif.

[73] Assignee: Harris Corp., Melbourne, Fla.

[21] Appl. No.: 109,164

[22] Filed: Oct. 16, 1987

[51] Int. Cl.[4] .............................. H04B 3/46
[52] U.S. Cl. ........................ 379/29; 379/22
[58] Field of Search ............ 379/23, 22, 26, 24, 379/27, 29, 31

[56] References Cited

U.S. PATENT DOCUMENTS

4,639,557  1/1987  Butler et al. .................... 379/29

Primary Examiner—Stafford D. Schreyer
Attorney, Agent, or Firm—Antonelli, Terry & Wands

[57] ABSTRACT

A direct access test unit for enabling a craftsperson at a telephone facility remote with respect to a central office to test subscriber lines comprises a first access port coupled to an access line circuit, by way of which the remote telephone facility communicates with the telephone office in the course of testing subscriber lines, and a second access port coupled to a test trunk circuit by way of which a subscriber line is to be tested by the test unit. Coupled between the first and second access ports is a processor-controlled subscriber line test/interface arrangement which is responsive to (tone) dial signals, generated by the remote telephone facility, and representative of a command to conduct a test of a selected one of a plurality of subscriber line circuits that are accessible by the test unit from the second access port, including the line circuit to which said remote telephone facility is connected, for accessing the subscriber line circuit via the second access port and conducting tests of the subscriber line circuit by way of the test trunk circuit. Stored within the memory of the processor which controls the operation of the test unit are voice message menus, each in a respectively different language (e.g. English, Spanish) the contents of which are controllably accessed and synthesized for transmission to the craftsperson via the first access port. The voice messages include instructions for guiding the craftsperson in the course of carrying out a test of a selected subscriber line.

30 Claims, 2 Drawing Sheets

DIRECT ACCESS TEST UNIT FOR CENTRAL OFFICE

FIELD OF THE INVENTION

The present invention relates in general to telephone systems and, more particularly, to a test unit located within a central office which is directly accessible by a craftsperson from a remote location, allowing the craftsperson to perform test functions on any subscriber line, including his own, without the need for participation by central office personnel.

BACKGROUND OF THE INVENTION

In U.S. Pat. No. 4,670,898, entitled 'Direct Access Test Unit For Central Office' issued June 2, 1987 by Ben A. Pierce et al and assigned to the assignee of the present application, there is described a test unit that is installed within the equipment frame of a central office which enables a craftsperson or field technician to conduct tests of subscriber lines without the intervention of central office personnel. For this purpose, the patented system is comprised of a processor-controlled interface and test signal generator arrangement that is adapted to be coupled between a line circuit in the central office, through which the craftsperson accesses (calls up) the unit, and a test trunk circuit in the central office through which communications with line circuits associated with the central office are effected. In operation, the craftsperson and the test unit communicate with one another through the tone signalling capability of the craftsperson's handset and voice messages generated by a processor-controlled speech synthesizer circuit within the test unit, the test unit conducting prescribed tests on a specified line circuit in response to tone-keyed test requests from the craftsperson. As a result of these communication and test capabilities of the patented direct access test unit, not only is the need for participation of central office personnel in the testing of subscriber lines circumvented, thereby simplifying troubleshooting, but the time required to conduct the tests is shortened considerably, which not only saves maintenance costs, but reduces the down time of malfunctioning lines.

SUMMARY OF THE INVENTION

In accordance with the present invention, the advantages enjoyed by the above-reference patented system are enhanced by an improved processing and interface capability which offers to the craftsperson additional testing functionality, including the ability to test his own line, the ability to cause the test unit to access a permanent release circuit and the ability to effect an immediate disconnect by keying a specified tone combination from the craftsperson's handset. In addition, the control software of the processor is augmented to enable the test unit to automatically conduct subscriber line tests during specified (minimal expected traffic) periods (e.g. at night) and to provide synthesized voice instructions to the craftsperson in a selected one of multiple languages.

For this purpose, in the improved direct access test unit according to the present invention, a number of features previously carried out by dedicated hardware are incorporated into the signal processing capability of the control processor so as to reduce the complexity of the test unit hardware and provide a more versatile test capability. In particular, rather than employ discrete signal detection and generator components such as tone generators, decoders, speech synthesizer and busy test circuitry, which are effectively non programmable and require unique interconnect routing on the printed circuit board, the test unit uses the signal processing capability of the control processor to accomplish not only each of the functions dedicated to these units, but additional functions not previously carried out, such as automatic line testing without any telephone personnel participation and multiple craftsperson voice instruction language capability, so as to provide a more powerful and versatile tool for the remote testing of subscriber lines. More particularly, the direct access comprises a first access port coupled to an access line circuit, by way of which the remote telephone facility communicates with the telephone office in the course of testing subscriber lines, and a second access port coupled to test trunk circuit by way of which a subscriber line is to be tested by the test unit. Coupled between the first and second access ports is a processor-controlled subscriber line test/interface arrangement which is responsive to (tone) dial signals, generated by the remote telephone facility, and representative of a command to conduct a test of a selected one of a plurality of subscriber line circuits that are accessible by the test unit from the second access port, including the line circuit to which said remote telephone facility is connected, for accessing the subscriber line circuit via the second access port and conducting a test of the subscriber line circuit by way of the test trunk circuit. Stored within the memory of the processor which controls the operation of the test unit are voice message menus, each in a respectively different language (e.g. English, Spanish) the contents of which are controllably accessed and synthesized for transmission to the craftsperson via the first access port. The voice messages include instructions for guiding the craftsperson in the course of carrying out a test of a selected subscriber line. The control processor is also programmed to control the accessing of a subscriber line circuit via the second access port and conducting a test of that subscriber line circuit by way of the test trunk circuit coupled thereto at a prescribed period in time independent of the receipt of command signals from the remote telephone facility.

The test/interface arrangement further includes a dedicated line monitor circuit for monitoring the line circuit for the presence of a line seizure condition and causing a line circuit loop termination to be coupled to the line circuit in response to detecting the line seizure condition. The line monitor circuit is also responsive to either a termination of the line seizure condition or a line circuit disconnect command from the remote telephone facility, for disconnecting the test unit from the subscriber line circuit. In addition, the test unit includes an audio monitor circuit, coupled between the line circuit and the test trunk circuit, for coupling audio signals produced by a subscriber line circuit and supplied to the second access port, to the first access port, and, in response to a command from the remote telephone facility, causing the trunk test circuit to place a busy test termination across the second access port, and coupling audio signals, applied to the second access port by a subscriber line circuit coupled thereto, to the first access port, so as to be monitored by the remote telephone facility. Where the subscriber line being monitored is a step-by-step line, this capability permits the craftsperson to dial in a command to the test unit, in response to which the control processor activates a permanent signal release circuit for releasing the monitored line circuit.

DETAILED DESCRIPTION

Figure 1A:
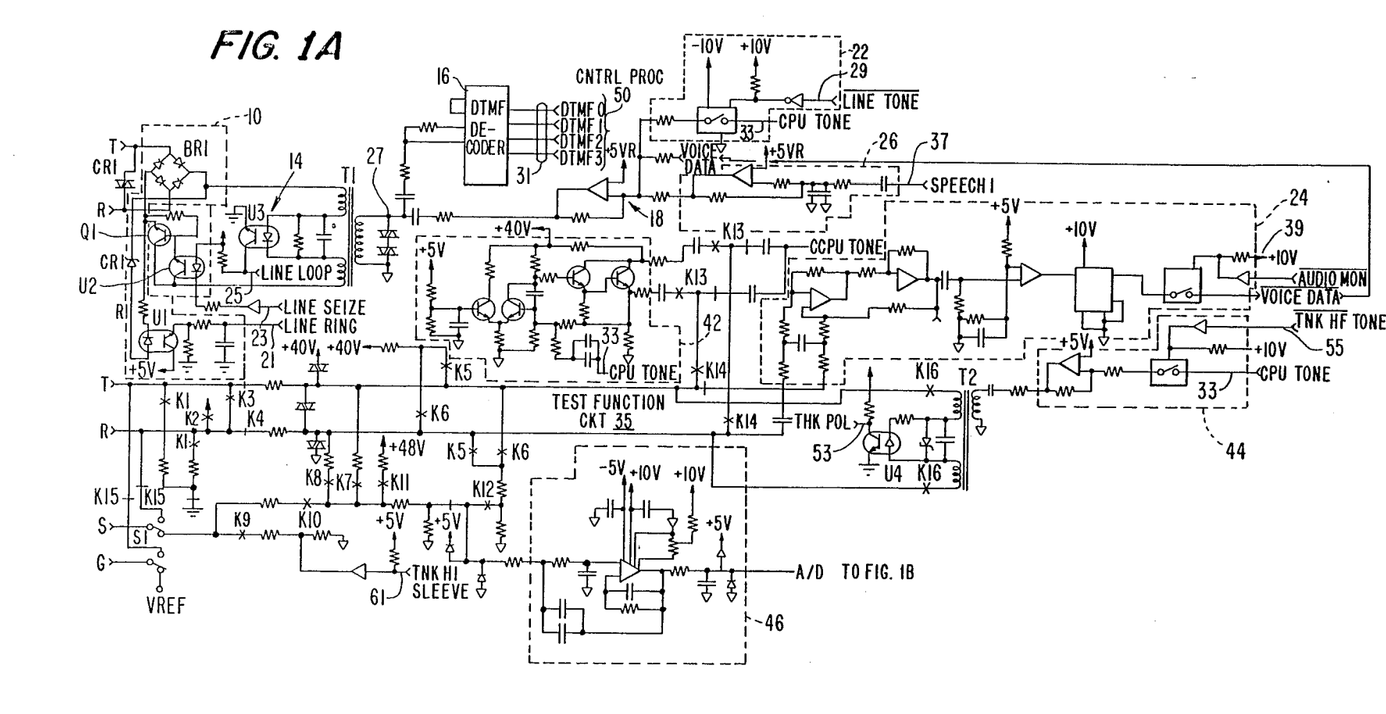
FIG. 1A and 1B represent a schematic diagram of a preferred embodiment of the invention.
Figure 1B:
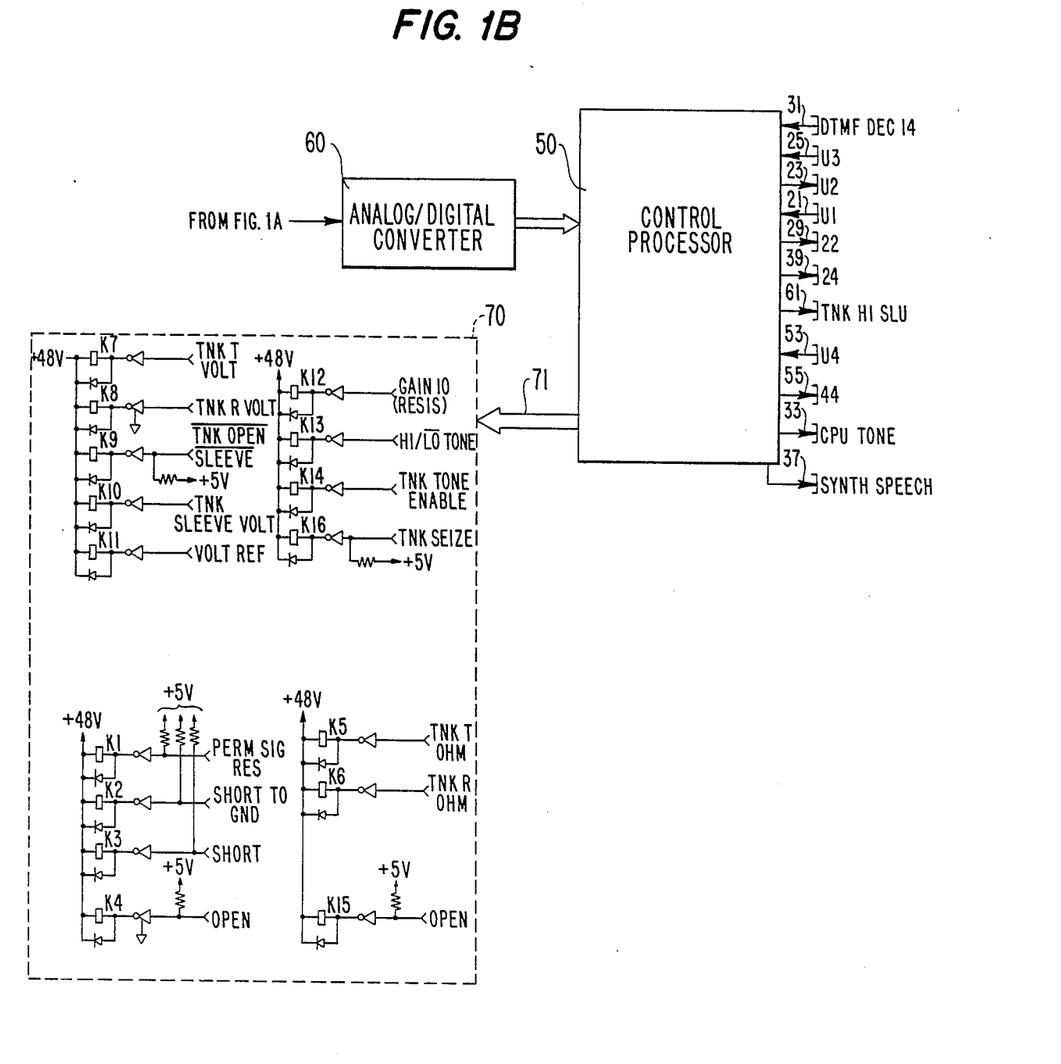

Referring now to the single FIGURE, the improved direct access test unit according to the present invention, which is to be installed within a central office, is shown as having a first or input access port P1 which is adapted to be connected to a line circuit by way of which a remote telephone facility accesses the test unit, and a second access port P2 coupled to a test trunk by way of which a subscriber line is tested by the test unit. The input access port P1 has respective tip T and ring R terminals for connection to a standard ground start line circuit by way of which the test unit is accessed. The tip T and ring R terminals are coupled to a rectifier bridge BR1, which forms part of a ring detect circuit 10, to a standard line transformer T1 of the type typically found in line circuits. Ring detect circuit 10 further includes a Zener diode CR1 and electro-optical isolator U1 coupled across the bridge BR1 the output of which is coupled over line 21 to a control processor 50. A line seize circuit 12, comprised of an electro-opto isolator U2 and associated transistor Q1, is coupled between a line seize output line 23 from control processor 50 and bridge rectifier BR1. A loop current detection circuit 14, comprised of an electro-opto isolator U3, is coupled across the primary windings of line transformer T1 and to an output line 25 from control processor 50.

As in the case of the test unit described in the above-referenced commonly assigned patent, control processor 50 is comprised of a conventional microprocessor and associated memory for storing data and programs required for performing the various functions described herein. In addition to controlling the overall operation of the direct access test unit, control processor 50 performs prescribed housekeeping tasks, such as maintaining an account of various accesses to the unit, storing data related to subscriber lines to be accessed, storing required security codes and maintaining a list of the identification of prefixes to be used for various test capable of being initiated by the test unit.

The secondary winding of line transformer T1 is coupled over link 27 to a dual tone multi-frequency (DTMF) decoder 16, which detects multi-frequency dial tones received by way of the line circuit connected to the tip T and ring R terminals and decodes these tones into a digital signal for application over link 31 to control processor 50. Link 27 from transformer T1 is also coupled to the output of an output amplifier 18, inputs of which are supplied from a tone amplifier 22, a line/audio monitor circuit 24 and a speech amplifier 26. Each of tone amplifier 22, line/audio monitor 24 and speech amplifier 26 are coupled to respective outputs of controlled processor 50 for receiving therefrom prescribed audio signals (tone or speech information) to be supplied to the craftsperson's remote telephone facility by way of the line circuit to which the input access port is connected.

More particularly, tone amplifier 22 has a tone input coupled over link 33 to a tone output port of microprocessor 50. A control input link 29 from the microprocessor controllably enables the tone amplifier 22 to couple a tone output supplied over link 33 from the microprocessor 50 to output amplifier 18. Such a tone may include standard dial tone (440 Hz) or any other frequency in a range typically from 20-4 KHz internally generated by the microprocessor 50. Speech amplifier 26 is coupled over link 37 to microprocessor 50 to receive synthesized speech signals to be coupled over the line circuit to the craftsperson. As pointed out above, in accordance with one aspect of the invention, microprocessor 50 stores a synthesized voice message menu in a plurality of different languages, one of which is selected by the craftsperson keying a prescribed input tone command from his handset when initially accessing the test unit. Thereafter, voice messages supplied by control processor 50 over link 37 will be synthesized in the selected language. Line/audio monitor circuit 24 is controllably coupled to a test function circuit 35 which, in turn, is coupled to the test trunk to permit the craftsperson at the remote telephone facility to monitor audio conditions at a remote line circuit being tested. The output of the line/audio monitor circuit 24 is controllably coupled to output amplifier 18 in response to a switch control signal on line 39 from control processor 50.

Also incorporated with test function circuit is a test tone amplifier circuit 42 the output of which is selectively coupled to the tip T and ring R leads of the test function circuit 35 by way of relay contacts K13 and K14 the operation of which will be described below. The output of tone amplifier 42 is coupled over a link 51 to control processor 50. It is through the tone amplifier 42 that control processor 50 supplies tone signals for conducting a tone test on a selected subcriberp's line.

The second access port P2 of the direct access test unit, in addition to the tip T and ring R terminals, is also provided with sleeve S and ground G terminals to be connected within the central office to a standard no-trunk test circuit, such as a Western Electric Company type SC-1A186-01 or equivalent. The tip T and ring R terminals of Port 2 are connected through relay contacts to be described below to primary windings of a transformer T2, opposite ends of which are coupled to an electro-opto isolator U4. The output of electro-optic isolator U4 is coupled over link 53 to control processor 50 and is used to inform the control processor 50 of a polarity reversal on the tip and ring portions of access port P2.

The secondary winding of transformer T2 is coupled to a trunk tone amplifier 44, one input of which is coupled to tone output line 33 of control processor 50 to receive a controlled MF tone input therefrom for dialing a subscriber line and a second input of which is coupled over line 55 to processor 50 for receiving an enable input signal from the processor 50 when an MF tone signal is to be coupled through amplifier 44 to the second access port P2.

The sleeve S and ground G leads of the access port P2 are coupled to a double-pole, double-throw switch S1 through which the tip T and ring R terminals of access port P2 may be coupled to its sleeve S and ground G terminals to permit the outgoing access port to be effectively coupled to a serial RS232 link in lieu of a normal telephone connection. The contacts of a relay K15 within a relay/driver unit 70 are coupled in lines connecting the tip T and ring R terminals to the ground G and sleeve S terminals, for controllably severing the two-wire to four-wire configuration. In the switch position shown, the sleeve S and ground G leads are decoupled from the tip T and ring R terminals for a normal four wire telephone trunk link connection. The ground G terminal is coupled to a source of reference potential while the sleeve S terminal is coupled to receive a prescribed reference voltage in response to a trunk high sleeve signal on link 61 from control processor 50.

The tip T and ring R terminals of the access port P2 are also switchably coupled to a number of reference potential coupling networks within test function circuit 35 comprised of switchably engaged impedance/reference voltage coupling paths by way of various relays which are controlled to perform prescribed tests of the subscriber line which is accessed in response to relay control signals from control processor 50, to be described below. The monitoring of the condition of the subscriber line being tested is carried out through an input amplifier 46 which is coupled to the tip T and ring R portions of the test function circuit 35 and has an output coupled over link 63 to an analog/digital converter 60 which is read by the control processor 50.

The various relay contacts of the direct access test unit, the operation of which will be described below, are controlled by a relay/driver unit 70 which comprises a plurality of relays and associated drivers, respective one of which are coupled over dedicated portions of an input link 71 from control processor 50, so as to respond to control signals generated at specific times in the course of conducting a test function, as will be described in conjunction with the description of operation of the system below.

Until accessed, either by a craftsperson located at a remote telephone facility dialing the ground start line circuit or in response to an internal soft timer within the control processor 50, the system is in its idle mode with the various relay contacts being in their positions shown in the FIGURE. Assume now that a craftsperson located at a remote telephone facility desires to test a subscriber line located at another position. The craftsperson dials the number of the ground start line circuit which is connected to the input port of the direct access test unit. (It is to be understood that the term "dial" and "dialed digits" are used in their generic sense in the telephone industry, to include all standard forms of generating subscriber line designating signals, whether they be dialed impulses or multi-frequency tones. In the present example, it will be assumed that the craftsperson has available to him a push button handset through which multi-frequency tones are generated.)

In response to being accessed in this manner, the ground start line circuit connected to the tip T and ring R terminals of the input access port P1 will apply a ringing voltage to the rectifier bridge BR1 within ring detector circuit 10. A ringing voltage of more than a prescribed level (e.g. 55 volts RMS) will cause Zener diode CR1 to conduct, thereby completing a circuit through resistor R1 to electro-optical isolator U1, so as to complete the circuit across the bridge BR1 and causing the level on output line 21 from the electro-opto isolator U1 to change state. This change-of-state signal on line 21 effectively "wakes up" control processor 50 and causes the control processor to supply a signal over link 23 to line seize circuit 12, causing the electro-opto isolator U2 with the line seize circuit to turn on which, in turn, causes transistor Q1 to conduct, closing the loop across the incoming tip T and ring R lines of Port 1. This, in turn, causes a ring trip in the ground start line circuit.

When the incoming line is seized in this manner, loop current is able to flow through the primary windings of transformer T1, thereby turning on electro-opto isolator U3 and causing an output signal to be supplied over link 25 to the control processor 50, indicating the detection of loop current. When the line has been seized and loop current is detected in the manner described above, control processor 50 responds by supplying a dial tone signal to the craftsperson. More specifically, control processor 50 supplies a 440 Hz tone over line 33 to tone amplifier 22. It also supplies an enabling signal over line 35 to close an internal switch with (or enable) tone amplifier, so that the 440 Hz tone may be coupled through output amplifier 18 over link 27 to the secondary winding of transformer T2 and thereby to the subscriber line to which the craftsperson's handset is connected.

Upon receiving dial tone, it is necessary for the craftsperson to dial a user security code to gain access to the testing features of the test unit. This user security code, which is stored in a table in microprocessor 50, will be known to the craftsperson if the craftsperson is authorized to utilize the test unit. If the craftsperson takes no action at all, control processor 50 will automatically release the line after a prescribed period of time has elapsed. Assume, on the other hand, that (in response to the craftsperson dialling his security code) dialing signals are received and decoded by decoder 16, which supplies a four bit code over link 31 to control processor 50 for the purpose of identifying each digit of the dial code. Within control processor 50, the received digits are compared with a user security code stored within the above-referenced Table to determine whether the dialing party (the craftsperson) should be permitted access to the test unit. Detection of the initially dialed digit by the decoder 16 causes control processor 50 to change the state of the dial tone enable link 35, thereby removing dial tone from the line, as is done conventionally in standard line circuits. If the digits received by the control processor 50 correspond to an authorized user access code, the state of line 35 will again then be enabled to cause (secondary) dial tone to be returned to the line circuit, informing the craftsperson that he has been given access to the test unit. If the received digits do not correspond to an authorized user access code, line 35 will not be enabled, so that secondary dial tone will not be coupled to the line and the craftsperson will know that he has either made an error in dialing the access code or has the wrong access code.

The software within the control processor 50 is defined so as to permit the calling party to try again a prescribed number of times in order to gain access to the test unit by supplying the proper user access code. However, if this is not achieved within a prescribed number of tries, control processor 50 will automatically release the line. The craftsperson will then know that he has either made an error in the dialing of the access code or has the wrong access code. In addition, when dialing the user access code, if the first digit is not entered within a prescribed period of time of receipt of dial tone (e.g. within one minute), or if too much time elapses between digits (measured by an internal soft timer) control processor 50 will change the state of line seize circuit 23 causing the unit to immediately disconnect. The user access code is also defined so as to select a prescribed one of a plurality of language in which a voice message menu is stored in the control processor.

Assuming that the craftsperson has dialed the proper user access code and has received dial tone, he will then dial the number of the subscriber line circuit upon which a test is to be conducted. If the craftsperson takes no action at all for a prescribed period of time (e.g. 10 seconds), the control processor 50 will supply a prescribed synthesized voice message over link 37 to speech amplifier 26 (in the language previously selected by the craftsperson's user access code), so as to inform the craftsperson that a seven digit subscriber line number should now be dialed. Obviously, if the craftsperson is familiar with the operating procedure for using the test unit, he will not need to wait for the voice message, but can immediately begin dialing the seven digit number of the subscriber line circuit to be tested. In this case, control processor 50 will not supply a voice message over link 37 to speech amplifier 26.

Depending upon the particular central office in which the direct access test unit is installed, control processor 50 is programmed to translate the seven digits dialed by the craftsperson to four or five digits and to add some number of steering digits (e.g. up to thirty-one) for those central offices requiring only four or five digits for access. In order to access the subscriber line designated by the received digits dialed by the craftsperson, control processor 50 seizes the trunk circuit by supplying a trunk seize signal over link 71 to relay K16 within relay/driver unit 70, causing relay contacts K16 in the tip T and ring R portions of the test trunk link at the primary of transformer T2 to close, thereby closing the loop to the trunk circuit. The trunk circuit responds to the seize-representative condition by reversing the polarity on the tip T and ring R leads, thereby causing electro-opto isolator U4 to supply an output over link 53 indicative of trunk polarity reversal. Control processor 53 responds to the change of state on link 53 by applying a set of multi-frequency signals to tone amplifier circuit 44 via link 33 and an enabling signal via link 55, respectively. These multi-frequency signals are generated in pairs, designating various digits required to identify the subscriber line circuit to be tested. The multi-frequency signals are coupled from the output of tone amplifier 44 through transformer T2 to the tip T and ring R lines of port P2.

If the correct number is dialed and the subscriber line to be tested has been accessed, the polarity on the tip T and ring R portions of the trunk circuit will reverse, causing electro-opto isolator 44 to supply a signal over line 53 to control processor 50 indicating that the subscriber circuit of interest has been accessed. Otherwise, line 53 will not change state, and processor 50 will deenergize relay K16 within relay/driver unit 70, causing contacts K16 to open. In this event, processor 50 transmits an error message to the craftsperson.

Assuming that the subscriber line circuit to be tested has been accessed, the tip T and ring R portions of port P2 will be monitored (via input amplifier 46, analog digital/convert 60 and processor 50 for) a busy condition. If the called subscriber line circuit is idle, the tip T and ring R portions of the loop should be open. To verify this condition, an impedance measurement is carried out by enabling relays K5 and K6, so as to close their respective contacts, as well as enabling relay K12, so as to provide a circuit path between the tip T and ring R portions of the test function circuit 35 to input amplifier 46 of analog-to-digital converter 60. In this way, control processor 50 reads the state of each of the tip T and ring R portions of test function circuit 35. If the measured impedance indicates that the called line is busy rather than idle (or open), control processor 50 will advise the craftsperson by way of the voice message "busy line". At the end of a prescribed period of time of monitoring a busy line, the unit will automatically return to the test mode, and a voice message will be supplied to indicate other options available.

Assuming that the subscriber line is not busy, processor 50 will generate a voice message such as "OK" to indicate to the craftsperson that the designated subscriber line has been accessed and has been found to be idle. The craftsperson may then dial a prescribed digit selecting a test to be performed with respect to the subscriber line circuit, and he will do so immediately if he is familiar with the test unit and its operation. If no digit is dialed by the craftsperson within a prescribed period of time after generation of the "OK" voice message (e.g. within seven seconds), control processor 50 will supply a series of voice messages listing different test functions that may be performed by dialing various digits. An example of such a voice message list is as follows:

DIAL TWO FOR AUDIO MONITOR
DIAL THREE FOR SHORT TO GROUND
DIAL FOUR FOR HIGH LEVEL TONE
DIAL FIVE FOR LOW LEVEL TONE
DIAL SIX TO OPEN SUBSCRIBER LINE
DIAL SEVEN TO SHORT SUBSCRIBER LINE
DIAL STAR TO KEEP TEST AFTER DISCONNECT
DIAL POUND FOR NEW SUBSCRIBER LINE

The craftsperson may then select one of the test functions to be initiated and dial the appropriate digit. Each time a test function is initiated in response to a digit dialed by the craftsperson, control processor 50 will supply a voice message identifying a test function, such as "audio monitor", "high level tone", "low level tone", "open line" and "short line". After a selection of the hold test utility function, the voice message "dial number of minutes" will be supplied to the craftsperson who is then expected to dial a single digit to designate the number of minutes the test currently in progress is to remain in effect after disconnect. Thus, while the test unit normally will disconnect immediately when the subscriber goes on hook, the unit has the capability of continuing a test function from one to ten minutes after going on hook, if so instructed.

After completion of each of the test functions initiated by the craftsperson, to the appropriate voice message from the control processor identifying that test function, the craftsperson may then dial another digit to select a new test or utility function. In addition, as is apparent from the above list of the voice messages relating to various test functions, when the craftsperson completes the testing of an identified subscriber line, it is not necessary to disconnect from the test unit in order to access another subscriber line for testing. After receiving a voice message acknowledging the completion of any test, the craftsperson may simply dial POUND for a new subscriber line and control processor 50 will supply secondary dial tone indicating that the unit is prepared to receive dialed digits relating to a new subscriber line.

As pointed out above, the various test functions are performed by the controlled energizing of relays which control the relay contacts within test function circuit 35 and the supply of appropriate control voltages or tones over the tip T and ring R terminals of port P2. For example, to perform an open test on the subscriber line, the control processor supplies an OPEN signal over link 71 to relay K4, opening contacts K4 in each of the tip T and ring R portions of the trunk circuit, which disconnects the tip T and ring R terminals of the output access port P2 from transformer T2.

To perform a short test, control processor 50 supplies a SHORT signal over link 71 to relay K3, which closes contacts K3 and places a short across the tip T and ring R portions of the trunk circuit so that a short test of the DC resistance can be performed.

To perform a short-to-ground test, processor 50 supplies a SHORT TO GROUND signal over link 71 to relay K2, which closes the contact between the ring R portion of the trunk circuit to +48V and opens the contact to ground.

To carry out a high level or low level tone test, control processor 50 supplies, over link 71, a HI/LO TONE signal to energize relay K13 and a TRUNK TONE ENABLE signal to energize relay K14, so as to connect the tone amplifier 42 to the tip T and ring R portions of the test function circuit 35 and insulate the test function circuit from line and to monitor circuit 24. A prescribed tone (e.g. 577 Hz) is coupled over tone link 33 to tone amplifier 42, through the closed contacts of relay K13 and out over the T and R portions of port P2. For a low level tone test, the low level tone will be applied from the tone amplifier 42 across tip T and ring R to perform a longitudinal simplex low level tone test which will not disturb traffic on a busy line To perform a differential high level tone test, the control processor simply changes the level of the tone supplied over link 33 to tone amplifier 42 for application to the tip T and ring R portions of the test function circuit 35

To terminate the trunk circuit to a prescribed reference voltage, control processor 50 supplies TRUNK T and TRUNK R signals over link 71 to energize relays K7 and K8 The closing of the contacts of relays K7 and K8 couples the tip T and ring R portions of the test function trunk circuit 35 to a prescribed voltage reference The reference voltage is selectively adjustable by energizing relay K11, the contacts of which are coupled to a voltage divider circuit to which the impedance path through closed contacts of relays K7 and K8 are coupled.

Trunk sleeve measurements are carried out by operating relays K9 and K10. For conducting a trunk high sleeve test, processor 50 supplies a TRUNK HIGH SLEEVE signal over link 61 and closes the contacts of relay K9. With the contacts of switch S1 in the position shown, the sleeve lead is coupled to a high sleeve reference. The closure of relay contacts K10 couples the sleeve lead through input amplifier 46 so that the processor can conduct the high sleeve measurement. For a trunk open sleeve condition, relay K9 is energized, so that the processor reads directly, via the closed contacts of relay 10, the sleeve lead voltage.

As pointed out previously, in accordance with the enhanced direct access test unit according to the present invention, rather than employ a plurality of dedicated signalling/interface circuits such as separate tone and speech generator circuits as employed in the test unit described in the above-referenced patent, the present invention makes use of the data storage and processing capability of the control processor and incorporates those functions, as well as additional functions, within the control process proper.

More specifically, as noted above, when the craftsperson accesses the direct access test unit, the code he dials indicates in which language he wishes to receive synthesized voice messages that are generated by the control processor and which contain instructions for guiding the craftsperson through the operational sequence by way of which the test unit tests a subscriber line. Depending upon memory space available, control processor 50 may store two or more sets of identical messages, each encoded to be synthesized in a specific language, such as English or Spanish, as noted above.

A further feature of the invention is the capability of enabling the craftsperson to directly test the line circuit from which he is calling. For this purpose, when the craftsperson wishes to test the line circuit of the subscriber line to which he is connected, after accessing the direct access test unit in the manner described previously and being instructed to dial a seven digit number of the line to be tested, he dials the line number of that particular subscriber line circuit to which he is connected and, in addition, a number or character on the handset which designates the particular test to be conducted, such as those listed above. The craftsperson then hangs up.

The control processor knows that the craftsperson is conducting a test on the line from which he is calling, from its table entry of numbers, and proceeds to carry out a prescribed test of that line after the craftsperson hangs up (makes the subscriber line to be tested go idle). The control processor monitors link 25 and, when it sees line loop current disappear, it seizes the trunk circuit and dials the subscriber line number to be tested (the craftsperson's subscriber line circuit number) and thereafter conducts the test identified by the digit dialed by the craftsperson. Only one test is conducted at a time, since there is no longer a dialogue between the control processor and the craftsperson who has gone back on hook at his remote telephone facility. After the elapse of a prescribed period of time (e.g. one minute) the trunk circuit goes to idle and the craftsperson is able again to access the direct access test unit by way of the subscriber line circuit to which he is connected. This capability provides the present invention with a significant advance over previous test units which require that the craftsperson access the test unit from a location other than the where subscriber line circuit to be tested is located. In a rural area, this has often required the craftsperson to travel a number of miles before reaching an available line circuit.

A further feature of the present invention is the ability of the test unit to conduct tests on specified line circuits at specific times without craftsperson participation. More particularly, during normal working daylight hours, accessing of the test unit is typically carried out by the craftsperson in response to maintenance schedules supplied by the telephone company. During off-duty/nighttime hours, however, where a craftsperson is not scheduled to be in the field to call into the central office and access the test unit, it is possible to conduct test of line circuits automatically. For this purpose, control processor 50 is programmed to perform tests automatically. Namely, rather than respond to and carry on a keyed tone/synthesized voice message dialogue with a craftsperson who has called the direct access test unit from a remote telephone facility, the control processor is programmed to automatically seize the test function circuit and to energize its associated relays during specific test periods (e.g. at night). Since all measurements on the access line are conducted through the trunk circuit terminal ports, with the electrical parameters themselves being measured through the input amplifier 46, analog to-digital converter 60 and control processor 50, there is no need to have an on-line craftsperson. At a subsequent time, such as during a reporting period the following the morning, a test results table may be selectively accessed to inform maintenance personnel of the results of the tests carried out on the specific line circuit designated during the previous evening.

A further feature of the present invention is the capability of enabling the craftsperson to access a permanent signal release circuit. More particularly, in conventional step-by-step telephone circuits, when a subscriber takes the phone off-hook, dial tone is generated on a continuous basis, rather than only for a prescribed time interval, after which a voice message, a loud howling tone and finally a low level "dead line" tone are provided, as in more contemporary telephone circuits. Since a step-by-step telephone circuit provides dial tone on an effectively continuous or permanent basis, the direct access test unit is unable to test the line. In this circumstance, it is necessary for the craftsperson to instruct the central office to engage a permanent signal release circuit. This has been conventionally carried out by a craftsperson communicating directly with central office personnel, who then engage the permanent signal release circuit to make the off-hook line release. In accordance with a further aspect of the present invention, the craftsperson is able to monitor the audio condition of the line to be tested and instruct the control processor to activate the permanent signal release circuit.

For this purpose, when conducting a busy test, the craftsperson is able to monitor the audio on the prescriber line being tested by way of the line/audio monitor circuit 24. The filter characteristics of the circuit are such that the voice content is effectively scrambled, so that the craftsperson can tell if someone is talking, as opposed to continuous dial tone. In the latter circumstance, the craftsperson dials a prescribed digit, causing the control processor to activate relay K1, which closes its contacts and effectively provides a release of the subscriber circuit.

A further feature of the present invention is the ability of the test unit to immediately release the line, rather than wait for line loop current to disappear. For this purpose, the control processor is programmed to respond to a prescribed keytone sequence (e.g. double POUND (##) input) from the craftsperson. Normally, the processor monitors the line loop current via link 25 from electro-opto isolator U3. When line loop current disappears, line 25 changes state, advising the processor that the line is no longer seized. As a time saving feature, the craftsperson may supply a prescribed key input, such as a double POUND command (##) from his remote test set. Control processor 50 responds to this double POUND command (##) by changing the state of line seize link 23 and effecting an immediate disconnect of the direct access test unit to the input access port.

In the foregoing description of the operation of the system, a dialogue of the inputing of information and the transmission of voice messages was conducted with a craftsperson who has accessed the direct access test unit from a remote facility. Prior to any craftsperson accessing the unit, however, it is necessary to 'prep' the system by telephone office supervisory personnel. Such preparation is normally carried out when the system is installed at the central office and may be updated at anytime thereafter. For this purpose, the test unit may be accessed for purposes of changing the stored data relating to security access codes, prefixes employed to identify test functions and to obtain access to various counters for obtaining reading of stored data. For this purpose, telephone personnel (usually a supervisor) wakes up the processor in the same manner described above. The control processor 50 will respond to a correctly dialed security code by generating a voice message such as "OK". In response to this voice message, the accessing party may then dial a single digit to select a particular programming function. If he does not do so with any prescribed period of time (e.g. seven seconds) after the generation of the "OK" message, control processor 50 will automatically read out a series of voice messages identifying the different single digits which will initiate various programming functions. An example of such messages is as follows:

DIAL ONE TO CHANGE SYSTEM SECURITY CODE
DIAL TWO TO CHANGE USER SECURITY CODE
DIAL THREE TO ADD PREFIX
DIAL FOUR TO CLEAR ALL PREFIXES
DIAL FIVE TO SET NUMBER OF DIGITS TO ACCESS SUBSCRIBER LINE
DIAL SIX TO READ PREFIXES
DIAL SEVEN TO READ ACCESS COUNTER
DIAL EIGHT TO READ JOB COUNTER
DIAL NINE TO CLEAR ALL COUNTERS
DIAL ZERO TO CLEAR ALARM
DIAL STAR TO SELECT DIALING METHOD

The supervisory calling party may then proceed to select one of the programming functions by dialing a single digit corresponding to that programming function. Thus, it is possible to change the system security code or the user security code, to add a prefix, to clear all prefixes, to set the number of digits required to access a subscriber line (for a particular central office), to read the prefixes, to read the access counter, to read the job counter, to clear all counters, to clear an alarm, and to select a dialing method. As in the case of initiating test functions relating to a subscriber line circuit by a remote telephone facility, after a programming function has been selected, control processor 50 will supply a voice message identifying that programming function or an indication of the next operation to be performed by the supervisor, to complete the selected programming function.

As will be appreciated from the foregoing description, the present invention provides an enhanced direct access test unit which not only is capable of performing the test functions described in the above-referenced patent, but is capable of conducting tests on the subscriber line from which the craftsperson at a remote telephone facility is calling. In addition, when initiating the test operation, the craftsperson may dial a code designating the language in which he wishes to hear voice messages from the control processor during the dialogue between the craftsperson and the processor in the course of conducting one or more test functions. The craftsperson also has the capability of instructing the control processor to activate a permanent release circuit and to immediately release the line from which the craftsperson is calling simply by dialing designating numbers.

Finally, operation of the direct access test unit may be performed automatically, without craftsperson remote control. For this purpose, the control software of the control processor is set up to accept specific test time interval commands in accordance with which the control processor initiates testing of designated subscriber lines and maintains a table of the results of those test for later use by telephone office maintenance personnel.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A direct access test unit to be connected in a telephone office for testing subscriber lines in response to commands from a remote telephone facility comprising:
   a first access port coupled to an access line circuit by way of which said remote telephone facility communicates with said telephone office in the course of testing subscriber lines;
   a second access port, coupled to a test trunk circuit, by way of which a subscriber line is placed in a prescribed electrical test condition by said test unit in accordance with a prescribed test to be conducted on said subscriber line circuit; and
   subscriber line test means, coupled to said first and second access ports, and responsive to a command supplied from said remote telephone facility via said access line circuit to said first access port, representative of a command to conduct a test of the subscriber line circuit to which said remote telephone facility is connected, for placing said subscriber line circuit in a prescribed electrical test condition via said second access port in accordance with a prescribed test of said subscriber line circuit.

2. A direct access test unit according to claim 1, wherein said subscriber line test means comprises means, for supplying selected voice messages, through said first access port over said access line circuit to said remote telephone facility, in a language prescribed in accordance with a command generated by said remote telephone facility.

3. A direct access test unit according to claim 1, wherein said subscriber line test means comprises means for accessing a subscriber line circuit via said second access port and placing said subscriber line in a prescribed electrical test condition circuit at a prescribed period of time independent of the receipt of command signals from said remote telephone facility.

4. A direct access test unit according to claim 1, wherein said test unit comprises means, coupled to said access line circuit, for monitoring said access line circuit for the presence of a line seizure condition and causing a line circuit loop termination to be coupled to said access line circuit in response to detecting said line seizure condition, and means, responsive to either a termination of said line seizure condition or a line circuit disconnect command from said remote telephone facility, for disconnecting said test unit from said subscriber line circuit.

5. A direct access test unit according to claim 1, wherein said test unit includes audio monitor means, coupled between access said line circuit and said test trunk circuit, for coupling audio signals produced by a subscriber line circuit and supplied to said second access port, to said first access port, and means, responsive to a command from said remote telephone facility, for causing a busy test termination to be placed across said second access port, and causing said audio monitor means to couple audio signals, applied to said second access port by a subscriber line circuit coupled thereto, to said first access port, so as to be monitored by said remote telephone facility via said access line circuit.

6. A direct access test unit according to claim 5, wherein said telephone office contains a permanent signal release circuit coupled to said second access port, and means, responsive to a command from said remote telephone facility, for activating said permanent signal release circuit, so as to release said subscriber line circuit monitored by said remote telephone facility by way of said audio monitor means.

7. A direct access test unit according to claim 2, wherein said subscriber line test means comprises means for accessing a subscriber line circuit via said second access port and placing said subscriber line circuit in a prescribed electrical test condition at a prescribed period in time independent of the receipt of command signals from said remote telephone facility.

8. A direct access test unit according to claim 7, wherein said test unit comprises means, coupled to said access line circuit, for monitoring said access line circuit for the presence of a line seizure condition and causing a line circuit loop termination to be coupled to said access line circuit in response to detecting said line seizure condition, and means, responsive to either a termination of said line seizure condition or a line circuit disconnect command from said remote telephone facility, for disconnecting said test unit from said subscriber line circuit.

9. A direct access test unit according to claim 8, wherein said test unit includes audio monitor means, coupled between said access line circuit and said test trunk circuit, for coupling audio signals produced by a subscriber line circuit and supplied to said second access port, to said first access port, and means, responsive to a command from said remote telephone facility, for causing a busy test termination to be placed across said second access port, and causing said audio monitor means to couple audio signals, applied to said second access port by a subscriber line circuit coupled thereto, to said first access port, so as to be monitored by said remote telephone facility via said access line circuit.

10. A direct access test unit according to claim 9, wherein said telephone office contains a permanent signal release circuit coupled to said second access port, and means, responsive to a command from said remote telephone facility, for activating said permanent signal release circuit, so as to release said subscriber line circuit monitored by said remote telephone facility by way of said audio monitor means.

11. A direct access unit according to claim 1, further including means, coupled to said second access port, for coupling said direct access test unit to a serial digital data link.

12. A direct access test unit to be connected in a telephone office for testing subscriber lines in response to commands from a remote telephone facility comprising:
   a first access port coupled to an access line circuit by way of which said remote telephone facility communicates with said telephone office in the course of testing subscriber lines;

a second access port coupled to a test trunk circuit by way of which a subscriber line is placed in a prescribed electrical test condition by said test unit in accordance with a prescribed test to be conducted on said subscriber line circuit; and subscriber line test means, coupled to said first and second access ports and responsive to a command supplied from said remote telephone facility via said access line circuit to said first access port, representative of a command to conduct a test of a selected one of a plurality of subscriber line circuits that are accessible by said test unit from said second access port, including the line circuit to which said remote telephone facility is connected, for placing said subscriber line circuit in a prescribed electrical test condition via said second access port in accordance with a prescribed.

13. A direct access test unit according to claim 12, wherein said subscriber line test means comprises means, for supplying selected voice messages, through said first access port over said access line circuit to said remote telephone facility, in a language prescribed in accordance with a command generated by said remote telephone facility.

14. A direct access test unit according to claim 13, wherein said voice messages include instructions for initiating the placing a selected subscriber line circuit in a prescribed electrical test condition via said second access port.

15. A direct access test unit according to claim 12, wherein said subscriber line test means comprises means for accessing a subscriber line circuit via said second access port and placing said subscriber line circuit in a prescribed electrical test condition at a prescribed period in time independent of the receipt of command signals from said remote telephone facility. access port.

16. A direct access test unit according to claim 12, wherein said test unit comprises means, coupled to said access line circuit, for monitoring said access line circuit for the presence of a line seizure condition and causing a line circuit loop termination to be coupled to said access line circuit in response to detecting said line seizure condition, and means, responsive to either a termination of said line seizure condition or a line circuit disconnect command from said remote telephone facility, for disconnecting said test unit from said subscriber line circuit.

17. A direct access test unit according to claim 12, wherein said test unit includes audio monitor means, coupled between said access line circuit and said test trunk circuit, for coupling audio signals produced by a subscriber line circuit and supplied to said second access port, to said first access port, and means, responsive to a command from said remote telephone facility, for causing a busy test termination to be placed across said second access port, and causing said audio monitor means to couple audio signals, applied to said second access port by a subscriber line circuit coupled thereto, to said first access port, so as to be monitored by said remote telephone facility via said access line circuit.

18. A direct access test unit according to claim 17, wherein said telephone office contains a permanent signal release circuit coupled to said second access port, and means, responsive to a command from said remote telephone facility, for activating said permanent signal release circuit, so as to release said subscriber line circuit monitored by said remote telephone facility by way of said audio monitor means.

19. A direct access test unit according to claim 12, wherein said subscriber line test means comprises processor-controlled test circuit means, connected to said second access port, for placing said selected subscriber line circuit in selected electricl test conditions in response to commands received from said remote telephone facility via said access line circuit and said first access port.

20. A direct access test unit according to claim 19, wherein said voice message include information relating to the status of tests conducted by said processor-controlled test circuit means.

21. A direct access test unit according to claim 12, wherein said voice message include information relating to the status of tests conducted by said processor-controlled test circuit means.

22. A direct access test unit according to claim 21, wherein said test circuit means includes means, responsive to a processor-generated control signal, for placing a short circuit across tip and ring terminals of said second access port.

23. A direct access test unit according to claim 21, wherein said test circuit means includes means, responsive to a processor-generated control signal, for applying a test tone signal across tip and ring terminals of said second access port.

24. A direct access test unit according to claim 23, wherein said test tone signal is a selected one of a high or low tone signal.

25. A direct access test unit according to claim 21, wherein said test circuit means includes means, responsive to a processor-generated control signal, for applying an open circuit condition from said second access port to said selected subscriber line circuit.

26. A direct access test unit according to claim 21, wherein said test circuit means includes means, responsive to a processor-generated control signal, for controlling the state of a sleeve terminal of said second access port.

27. A direct access test unit according to claim 19, wherein said subscriber line test means includes decoder means for decoding dialing signals representing at least one digit from said remote telephone facility for controlling said subscriber line test means to effect a selected electrical test condition designated by said dialing signals on said selected subscriber line circuit.

28. A direct access test unit according to claim 21, wherein said test circuit means includes means, connected to tip and ring terminals of said second access port, for detecting a busy condition in a subscriber line circuit connected to said second access port via said test trunk and audio monitor means for controllably coupling audio signals received from said second access port to said first access port for application to said remote telephone facility to be monitored thereby when said selected subscriber line circuit is busy.

29. A direct access test unit according to claim 28, wherein said audio monitor means includes means for scrambling said audio monitor signals so as to render them unintelligible at said remote telephone facility.

30. A direct access unit according to claim 12, further including means, coupled to said second access port, for coupling said direct access test unit to a serial digital data link.

* * * * *